United States Patent [19]
Jenssen et al.
[11] Patent Number: 4,759,982
[45] Date of Patent: Jul. 26, 1988

[54] TRANSFER GRAPHIC ARTICLE WITH ROUNDED AND SEALED EDGES AND METHOD FOR MAKING SAME

[75] Inventors: Jeffrey R. Jenssen, Woodbury; Kenneth G. Olson; John W. Frank, both of Cottage Grove, all of Minn.

[73] Assignee: Minnesota Mining and Manufacturing Company, St. Paul, Minn.

[21] Appl. No.: 941,023

[22] Filed: Dec. 12, 1986

[51] Int. Cl.[4] ........................ C09U 7/02; B60R 13/00; B41M 3/12; B32B 23/02

[52] U.S. Cl. ...................................... 428/343; 428/31; 428/41; 428/192; 428/194; 428/914; 29/527.4

[58] Field of Search ................ 428/31, 40, 343, 913.3, 428/914, 194, 41, 195, 201, 192; 29/527.4

[56] References Cited

U.S. PATENT DOCUMENTS

| | | | |
|---|---|---|---|
| 4,022,926 | 5/1977 | Keough et al. | 428/41 |
| 4,126,741 | 11/1978 | Carleton et al. | 428/913.3 X |
| 4,332,074 | 6/1982 | Auld et al. | 428/913.3 X |
| 4,356,617 | 11/1982 | Cascia | 428/13 X |
| 4,369,225 | 1/1983 | Manabe et al. | 428/31 X |
| 4,481,160 | 11/1984 | Bree | 428/913.3 X |
| 4,556,929 | 12/1985 | Waugh | 428/31 X |
| 4,560,596 | 12/1985 | Coscia | 428/31 |
| 4,605,575 | 8/1986 | Auld et al. | 428/31 X |

*Primary Examiner*—George F. Lesmes
*Assistant Examiner*—D. R. Zirker
*Attorney, Agent, or Firm*—Donald M. Sell; James Smith; Robert H. Jordan

[57] ABSTRACT

A process for preparing a transfer graphic article having a protective clear coat in precise registration therewith such that the graphic has rounded and sealed edges, and the article produced thereby. The edges of the underlying adhesive are sealed by the clear coat such that improved solvent resistance is achieved.

9 Claims, 2 Drawing Sheets

TRANSFER GRAPHIC ARTICLE WITH ROUNDED AND SEALED EDGES AND METHOD FOR MAKING SAME

FIELD OF INVENTION

This invention relates to a transfer graphic article, and to a method for making same. More particularly, it relates to an article comprising a transfer graphic having a protective coating thereover, such that the graphic has rounded and sealed edges.

BACKGROUND

On site application of paint directly to a surface to be decorated is the time-honored method for providing a graphic design, such as a decorative design. While such a process provides many aesthetic and physical features, including realistic appearance, color flexibility, durability to abrasion, weathering and chemical attack, it also suffers from many disadvantages. For example, relatively skilled labor is necessary. Long application times are usually the rule, and potential contamination to adjacent areas, particularly mechanical equipment, can occur. Accordingly, prefabricated film graphics have been utilized to avoid many of these disadvantages. Such film graphics, often called "decal" or "transfer graphic", when utilized on the exterior surface of vehicles, typically require extreme resistance to abrasion and chemical attack because of exposure of the vehicle surfaces to various atmospheres or environments. Accordingly, such graphics must generally be provided with a protective clear coat over the graphic areas.

This protective clear coat can be located in registry with the graphic area by applying a continuous layer of clear coat over the graphic and non-graphic areas, and subsequently cutting through the several layers precisely at the outline of the graphic area, typically called "die cutting" or "kiss cutting". This approach results in substantially vertical or right angle edges of the graphic and protective clear coat which can collect dirt, wax, and other foreign materials which can detract from the aesthetics of the applied graphic design. Responsive thereto, a sealing agent, e.g., SCOTCHCAL Brand 4150 Edge Sealer, available from the Minnesota Mining and Manufacturing Company ("3M") may be applied about the edges of such a graphic after application to the vehicle. The sealing agent protects the exposed sides of the graphic and adhesive from chemical attack and reduces the mechanical forces acting thereon. This technique is most typically practiced in the airline industry.

A second approach is to apply the protective clear coat only to graphic areas, as, for example, by screen printing, or utilizing a stencil with an open area corresponding precisely to the outline of the graphic design. Those skilled in the art are aware of the difficulty encountered with such a process, because of factors such as dimensional changes in the film substrate, tension variables in the screen mesh, and accurate positioning of the substrate in registry with the stencil. Small graphics, such as those with overall dimensions of not greater than about 12 inches×12 inches (30 centimeters×30 centimeters) can generally be manufactured with satisfactory registration by those having requisite skill. However, this becomes much more difficult for larger graphic areas, and particularly for decorative items such as pin stripes which are common for the vehicle or automotive market.

U.S. Pat. No. 4,356,617 (Coscia) discloses the formation of a raised dike around a graphic design for the purpose of controlling the flow of a coating composition applied thereto. The reference further teaches that such flow may also be controlled by a groove or gap around the design if the coating composition has sufficient surface tension. U.S. Pat. Nos. 4,332,074 (Auld et al.) and 4,605,575 (Auld et al.) disclose utilization of integral bezels for similar purpose. Such techniques do not provide application of the protective clear coat to the adhesive layer which adheres the graphic design to a desired substrate, thereby leaving the edges of the adhesive exposed and subject to collection of foreign materials and environmental degradation.

Yet another approach which could be utilized is to apply the protective clear coat with a substantial oversize border to assure complete coverage of the graphic area. While this method achieves the required objective of protection for the graphic design, it is generally considered not to be aesthetic.

Application Ser. No. 846,754, filed Apr. 1, 1986, commonly assigned herewith, discloses a graphic pattern having a protective coating thereon in exact registration therewith and a process for forming the same. It is taught that adhesive may be applied to the bottom of the coated graphic for application to a substrate. According to the process disclosed therein, an imaging composition, which has sufficient surface tension to wet a carrier, is applied, e.g., by screen-printing, to the carrier and dried to form a graphic pattern thereon. A liquid protective coating is applied over the graphic pattern in an oversize border therewith. The protective coating has sufficient surface tension to wet the graphic pattern but not the carrier surface whereby during drying the protective coating will dewet the major surface of the carrier to provide exact registration with the graphic pattern. Following drying of the protective coating, the article is laminated to a premask tape, the carrier is removed and an adhesive is applied to the underside of the graphic pattern for subsequent transfer to a substrate. Although detailed transfer graphics may be achieved by such method, the adhesive is not covered by the protective coating, thus resulting in exposed edges subject to collection of foreign materials and environmental attack.

Although application of a protective clear coat by screen printing is a typical technique, other methods such as roller coating or spray coating may also be considered, providing a dry film thickness of from about 0.5 to about 4 mils (0.01 to 0.1 millimeters) thickness is achieved.

Summarizing, an acceptable protective clear coat should be of sufficient thickness to provide adequate wearability and resistance to chemical environments, and precisely cover the graphic area, whether same be large or small, and whether it be a simple geometric shape, such as a narrow width line, or a complex intricate design. An acceptable protective clear coat should further cover the adhesive means which secures the graphic to the substrate thereby inhibiting unsightly collection of foreign matter and protecting the adhesive. Known techniques described above do not satisfy all these requirements.

Accordingly, the present invention provides precise registration of a clear protective coat over a graphic pattern and underlying adhesive; the protective coat has tapered, rounded and sloping edges which seal the edges of the graphic pattern and adhesive, thereby inhibiting the buildup of wax and foreign matter at the edge portions, and looks integrated with the substrate; i.e., provides a paint-like look; the process can accommodate varying process tolerances, operator variability and equipment tolerances; and the process provides a lenticular appearance on thin pin stripes, such as may be placed on vehicle surfaces.

SUMMARY OF INVENTION

In accordance with the invention, a dry transfer graphic article comprising a graphic pattern and underlying adhesive is provided which has a protective coating thereon in "precise registration" (as defined herein) therewith such that the graphic has rounded and sealed edges and a paint-like appearance when applied to a desired substrate. The protective clear coat protects the transfer graphic from abrasive forces and prevents collection of foreign matter at the edges of the graphic pattern and underlying adhesive. Further, the clear coat provides unexpected solvent resistance to the adhesive, thereby improving the durability and longevity of such graphics. There is also provided a process for making such a graphic transfer article.

"Precise registration" is defined herein to mean a slight oversize border which is approximately 5 mils (0.12 millimeters) or less in width. Such borders provide the desired protection and sealing of the graphic pattern and adhesive, but are essentially undistinguishable to the unaided eye, thus clear coats having such borders appear to be in precise registration with the graphic or visually coincident therewith.

In brief summary, the dry transfer article provided herein comprises: (1) a graphic pattern; (2) an underlying layer of adhesive in exact registration therewith; and (3) a clear coat having a rounded profile which covers the graphic pattern and seals the edges thereof and edges of the underlying adhesive layer.

Briefly summarizing, the process for making such a transfer graphic article comprises: (1) providing a carrier having a major surface; (2) coating a layer of adhesive, typically pressure-sensitive adhesive, thereon; (3) applying an imaging stratum, e.g., a polymer film of desired color, thereover; (4) trimming the imaging stratum and underlying adhesive in imagewise fashion to provide the desired graphic pattern, e.g., by kiss-cutting and removal of the nonimagewise portions of the same; (5) applying a liquid protective coating over the graphic pattern, in substantial registration therewith, the protective coating composition having a surface tension sufficient to wet the graphic pattern and exposed edges of the underlying adhesive, but not the major surface of the carrier; and (6) drying the coating of protective material, whereby upon drying the protective clear coat dewets or retracts from the major surface of the carrier into precise registration with the graphic pattern, sealing the edges of the graphic pattern and underlying adhesive and providing a rounded profile. If desired, an imaging composition, e.g., ink, may be applied to the imaging stratum before trimming to provide special effects, e.g., a multicolor graphic, etc.

BRIEF DESCRIPTION OF DRAWING

The invention is further explained with reference to the drawing wherein.

Figure 1:
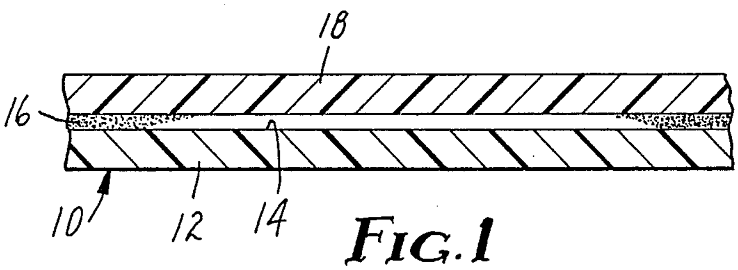
FIG. 1 is a cross-sectional representation of an imaging stratum and underlying adhesive layer which have been applied to a carrier.

These figures, which are not to scale, are intended to be merely illustrative and not limiting.

DETAILED DESCRIPTION OF INVENTION

The invention relates to a transfer graphic article having a protective coating thereon such that the article, including graphic pattern and underlying adhesive in registry therewith has rounded and sealed edges. The protective coating is in precise registration with the graphic pattern thereby providing an aesthetically pleasing unitary appearance. The invention also relates to a process for the manufacture of a dry transfer graphic article which comprises the steps of applying to a carrier surface an imaging stratum and underlying adhesive to form a desired graphic pattern, and applying thereover a protective clear coat, the clear coat being applied beyond the edge definition of the image areas, the surface energy of the carrier being sufficiently low relative to the surface tension of the protective clear coating that non-wetting of the carrier by the protective coating occurs, and same therefor "creeps" back to the surface and edges of the graphic pattern and underlying adhesive into precise registration with the graphic pattern and underlying adhesive.

The carrier comprises a material which inherently has a low surface energy, or has a low surface energy coating thereon, e.g., a paper or polyester film with silicone coating thereon. The carrier functions to provide a base surface having sufficient rigidity on which to coat the adhesive and apply the imaging stratum, e.g., a polymer film, and trim the same in imagewise fashion, e.g., by kiss cutting and removing weed; yet has a sufficiently low comparative surface energy such that as the clear liquid protective top coat dries thereon, same will not wet, or will retract from, the carrier surface onto the graphic film and and underlying adhesive. In addition, the carrier functions as a release liner and must allow for easy release of the graphic transfer therefrom, i.e., the adhesion of the adhesive thereto should be releasable.

The imaging stratum comprises a material such as a polymer film. The film is preferably a material of desired color which has a surface energy which is higher than that of the carrier such that when the protective clear coat is applied it will dewet or retract from the carrier surface onto the imaging stratum and underlying adhesive.

The underlying adhesive should provide high adhesion to the imaging stratum and desired substrate to which the ultimate graphic is applied, yet should releasably adhere to the carrier.

The adhesive may first be coated on the carrier and the imaging stratum then applied thereto, or it may first be coated on the imaging stratum, e.g., a film, following which the precoated imaging stratum is applied to the carrier. The adhesive should form a substantially continuous layer covering at least the area of the desired graphic pattern, and preferably extends at least slightly therebeyond, such that a layer of adhesive will underly substantially all of the graphic pattern, providing secure adhesion to the substrate. Examples of suitable adhesive-precoated films include SCOTCHCAL Brand 3650 Series Polyvinvl Chloride Films, and SCOTCHCAL Brand 5690 Series Polyester Films, which have acrylic type pressure-sensitive adhesives on the back side and are available from the Minnesota Mining and Manufacturing Company ("3M").

FIG. 1 shows carrier 10 comprising a polymer film 12 with surface 14 having a low surface energy to which adhesive 16 and imaging stratum 18 have been applied.

If desired, e.g., for multi-color graphic patterns, an imaging composition or material may be coated or printed on the imaging stratum in desired pattern.

The imaging material can be comprised of conventional imaging materials used to form graphic images on substrates, such as inks, for example. The exact composition of the imaging material depends on the end use properties required. The imaging material is typically applied from a wet composition having surface tension properties such that the composition will wet out and flow on the imaging stratum to form a film and provide a visible printed pattern thereon. Imaging materials may be colored or colorless, although colored compositions are preferred. If desired, special effects may be achieved if the composition provides a product which is visible under ultraviolet light, but is colorless under ordinary ambient light. Conventional inks can be utilized, such as the vinyl or vinyl acrylic inks commerically available.

Screen printable inks can be classified on the basis of formation of an ink film, and the vehicles used for that film formation. For example, solvent-based inks form a film by evaporation of the various solvents contained therein, i.e., the wet film is dried. Curable inks provide a film which becomes polymerized through chemical change. Examples of inks include enamels; solvent-based inks, e.g., those containing lacquers and other solvents, poster inks, and water-based inks; those containing 100 percent solids, such as those based on epoxies, ultraviolet exposure systems, plastisols, etc.; and specialty inks, such as those which are expandable, those which exhibit electrical properties, etc.

To obtain good wetting, i.e., maximum surface contact on the imaging stratum, the surface tension of the ink must be equal to or less than the critical surface tension of the imaging stratum. In other words, the imaging stratum must have a higher degree of surface wetability than the imaging composition. However, the surface tension of the film formed by the imaging composition must be greater than that of the carrier surface such that the protective coating will properly dewet from the carrier surface to achieve desired registration with the graphic. If the surface tension of the film formed by the imaging composition is not sufficiently greater than that of the carrier surface, precise registration of the clear coat with the graphic pattern may not be achieved. Specific solvents, surfactants, and other conventional and known additives can be utilized to modify the surface properties of the imaging composition, as desired.

Multiple imaging composition films, such as of different colors, may also be printed in sequence if desired.

Figure 2:
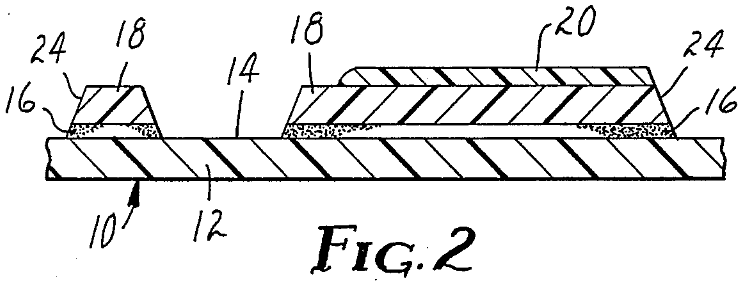
FIG. 2 is a cross-sectional representation of the construction of FIG. 1 after an image composition has been printed thereon and a desired graphic pattern has been formed by kiss-cutting and weeding in an imagewise fashion.

The imaging stratum, imaging composition film, if any, and underlying adhesive are then trimmed in an imagewise fashion to provide the desired graphic pattern, such as by kiss cutting in imagewise fashion and removing undesired portions, i.e., weed. Care should be taken when kiss cutting in that cutting too deeply, i.e., into the carrier, may tend to cause the clear coat composition to incompletely dewet from the carrier during drying, whereas failure to cut deeply enough, i.e., not completely through the adhesive layer, may interfere with complete stripping of the weed. FIG. 2 shows adhesive 16, imaging stratum 18, and imaging composition film 20 on carrier 10 after kiss-cutting and weeding to form the desired graphic pattern.

This invention relates to a process utilizing the surface tension characteristics of each of the four components of the process, i.e., the carrier surface, the imaging stratum, the imaging composition, if any, and the protective clear coat. Usually, one begins with a determination of the critical solid surface tension of the carrier surface and then tailors the other components to meet the requisite surface tension requirements. The surface energy of a film can be determined in a number of ways. For example, a series of liquids of known surface tension can be applied to a smooth test surface. The contact angle of these liquids on the solid surface is measured, and this information can then be plotted against the known surface tension of the respective liquids. Extrapolation of such data to a zero contact angle provides the solid surface tension, i.e., that of the carrier surface, since at this point the surface tension of the solid film is approximately equal to that of the liquid. This surface tension thus becomes the critical solid surface tension. When utilizing this procedure with a silicone-coated carrier, surface tension was calculated to be 23.8 dynes/centimeter, which is in agreement with the reported literature value of 24 dynes/centimeter.

Similarly, results of contact angle measurements for liquids having known values of liquid surface tension due to dispersion forces and polar forces, both of which contribute to surface free energy can be utilized.

Finally, wetting tension test kits are commercially available to determine the critical surface tension of specific film substrates.

Examples of typical surface tension values include about 32 dynes/centimeter for polyvinyl chloride films which can typically be corona treated to yield values of about 60 to 70 dynes/centimeter, and about 26 to 35 dynes/centimeter for typical vinyl inks which can also be corona treated to yield surface energies of greater than 60 dynes/centimeter.

Once the critical solid surface energy of the carrier surface is known, an imaging stratum can be selected and an imaging composition can be tailored thereto to provide or produce a good graphic pattern which can be clear coated with the desired precise or visually coincident registration.

Once the desired graphic pattern is appropriately formed on the carrier surface, the protective clear coat can be formulated based on solvent selection, particular resin, and other additives which together provide a formulation which is capable of wetting the dry graphic pattern and exposed adhesive layer sufficiently, and yet is not capable of wetting the carrier surface.

Other critical factors include the solvation of the coating composition and its rate of drying, in addition to its relative surface tension.

The protective clear coat is made typically of a resinous film-forming material, an example thereof being aliphatic polyurethanes, which are conventionally utilized today to provide a protective top coat for a transfer graphic image.

The liquid top coat is printed, as by screen printing, for example, over the graphic pattern, and slightly beyond the edge definition thereof, i.e., typically with an overprint margin up to about 100 mils (2.54 millimeters) wide, so as to assure complete coverage of the graphic pattern. As this liquid coat dries, it will dewet, i.e., creep or retract from the carrier where it has been overprinted onto the graphic pattern into precise registration therewith, and can be cured in conventional fashion. Preferably, the liquid is printed at least 5 mils (0.12 millimeter) beyond the edge of the graphic pattern to ensure complete sealing of the edges of same and underlying adhesive. Overprint margins of increasing width may cause the overcoat to puddle on the carrier or to bridge gaps within the graphic pattern, e.g., spaces between parallel strips such as are provided for "racing" stripes used for automotive decoration.

Accordingly, the protective clear coat provides a variable high thickness over the surface of the graphic pattern and seals the edges of the graphic pattern and underlying adhesive. Thus the clear coat protects the graphic pattern and underlying adhesive from chemical and environmental attack, thereby increasing the durability thereof, and also provides a unitary, paint-like appearance, thereby improving the attractiveness thereof.

Preferably the final thickness of the clear coat is at least 0.5 mil (0.01 millimeter), and not greater than about 4 mils (0.1 millimeter). Thinner clear coats tend to provide less effective protection to the graphic pattern and underlying adhesive whereas those substantially thicker than the indicated range may tend to give the graphic an undesirable artificial appearance.

Figure 3:
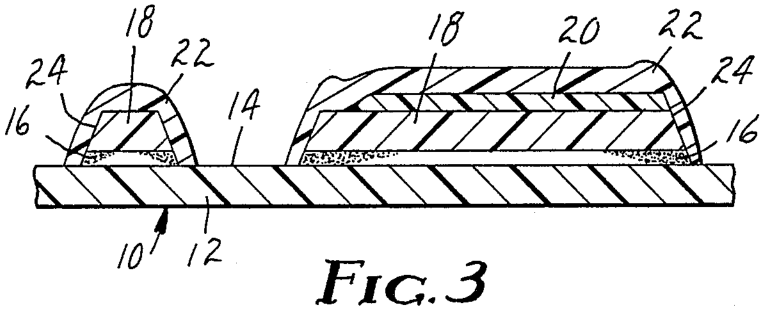
FIG. 3 is a cross-sectional representation of the construction of FIG. 2 after a liquid protective coating has been applied and dried thereon.

FIG. 3 shows the rounded profile provided by clear coat 22 after it has dried. The edges 24 of imaging stratum 18, underlying adhesive 16, and imaging composition film 20 have been sealed by clear coat 22.

Surprisingly, in addition to preventing collection of foreign matter at the edges of the transfer article, it has been found that the clear coat provides excellent solvent resistence to the graphic, particularly to the underlying adhesive. Thus it is preferred that the clear coat and underlying adhesive are mutually reactive to achieve an optimum seal. For instance, an isocyanate-containing clear coat composition and acrylic acid-containing adhesive will typically react to provide a chemical bond between the adhesive layer and clear coat, such a bond typically providing exceptional solvent resistance to the adhesive layer.

Figure 4:
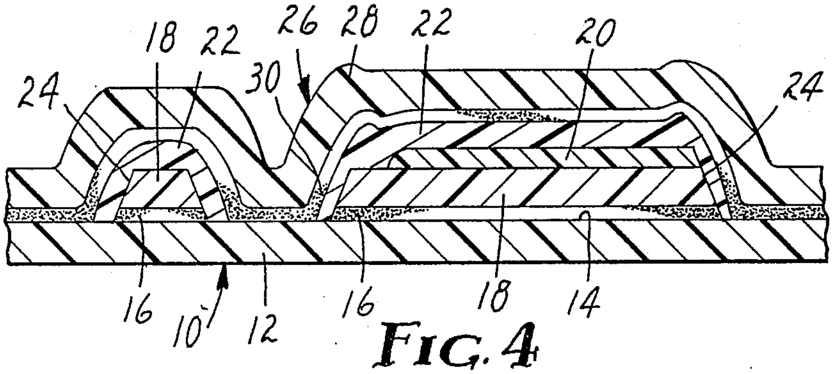
FIG. 4 is a cross-sectional representation of the construction of FIG. 3 after lamination of an application tape thereto.
Figure 5:
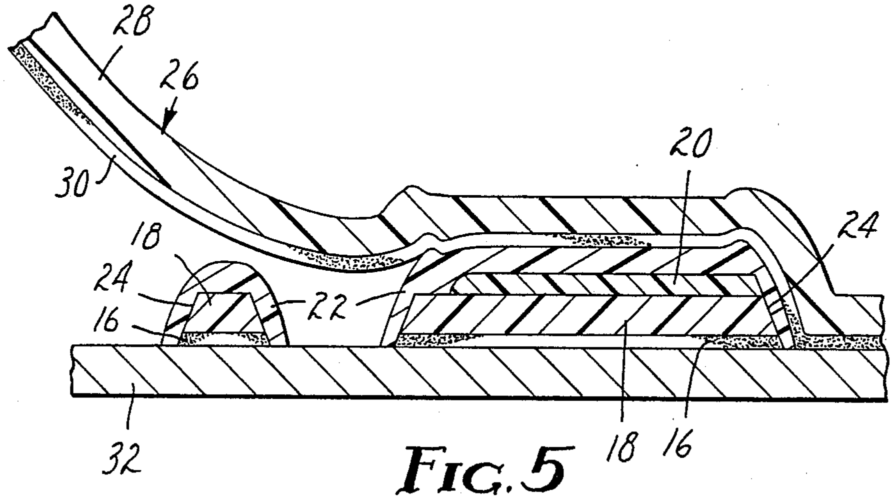
FIG. 5 is a cross-sectional representation of a transfer graphic of the invention being applied to a substrate.

As shown in FIG. 4, the article can then be laminated to a conventional application tape 26, i.e., a flexible film 28 having a low-tack adhesive 30 thereon, whereupon imaging composition film 20, imaging stratum 18, underlying adhesive 16, and overlying protective coat 22 can be stripped away from the carrier 10, which can then be discarded, and the transfer article then applied to a substrate. Following burnishing action, e.g., with a squeegee, the application tape is removed leaving the transfer article adhered to the substrate. FIG. 5 shows the transfer article adhered to substrate 32 after application tape 26 has been partially removed.

In this manner, there is provided a low profile, high performance, durable graphic transfer system, having special utility in the automotive market place. For example, the invention can provide an automotive stripe or marking which is unique in appearance and performance properties, in that the graphics produced by the invention have rounded edges and closely similate paint, a technique not heretofor available with a transfer graphic system. Further, the graphics disclosed herein are very durable and resistant to forces typically encountered by automobile finishes, e.g., abrasive action, dirt impact, and solvent attack.

The invention will now be further illustrated by the following illustrative examples, wherein all parts are by weight unless otherwise specified.

EXAMPLE 1

A SCOTCHCAL Brand 3655 Film comprising a polyvinyl chloride film coated with an acrylic pressure-sensitive adhesive protected with a silicone coated paper release liner was used as the imaging stratum, underlying adhesive and carrier.

The film and underlying adhesive were hot kiss cut in an imagewise fashion ("racing" stripes) using a Teflon-coated, etched magnesium die at a temperature of 350° F. (175° C.) to produce edges with a tapered profile.

The weed was then removed from the carrier to produce the graphic pattern.

A clear coat was then applied to the graphic pattern with an overprint margin of about 20 to 40 mils (0.50 to 1.0 millimeter) using a 110 mesh screen. The clear coat, a two component polyurethane, had the following formulation:

| Component | Parts |
|---|---|
| DESMOPHEN 651A-65 - rigid polyester polyol; 65% solids in ethyl glycol acetate; equivalent wt. of 325; % hydroxyl of 5.2 (available from Mobay Chemical, Inc.) | 46.5 |
| DESMOPHEN 670-90 - flexible polyester polyol; viscous liquid, 90% solids; equivalent wt. of 439; % hydroxyl of 3.9 (available from Mobay Chemical, Inc.) | 12.5 |
| DESMDUR N-100 - aliphatic polyisocyanate; viscous liquid, 100% solids; equivalent wt. of 190; % NCO of 22 (available from Mobay Chemical, Inc.) | 31.0 |
| TINUVIN 770 - hindered amine stabilizer (available from Ciba-Geigy, Inc.) | 0.9 |
| TINUVIN 328 - benzotriazole UV absorber (available from Ciba-Geigy, Inc.) | 3.0 |
| MULTIFLOW - acrylic copolymer resin solution, 50% solids in xylene; specific gravity 25/25° C. of 0.925-0.940; refractive index at 25° C. of 1.481-1.485 (available from Monsanto Industrial Chemicals Co.) | 1.8 |
| FC-430 - fluorocarbon flow additive (available from 3M) | 1.0 |
| CARBITOL ACETATE - diethylene glycol monoethyl ether acetate (available from Union Carbide) | 5.1 |

The clear coat was cured at 165° F. (75° C.) for one hour.

An application tape was laminated to the transfer graphic article.

The graphic was applied to a painted steel plate substrate.

The transfer graphic had rounded, unitary appearance similar to that of paint.

The solvent resistance of the graphic was tested by soaking the graphic and substrate in a solution comprising 90 parts unleaded gasoline and 10 parts ethanol for about 40 minutes at room temperature. After being removed, the dried transfer graphic retained its initial, paint-like appearance, having suffered no apparent degradation.

EXAMPLE 2

A transfer graphic was made and applied to a substrate as in Example 1.

Solvent resistance was tested by soaking the graphic and substrate in toluene for about 5 minutes at room temperature. After being removed and dried, the transfer graphic retained its initial, paint-like appearance, having suffered no apparent degradation.

EXAMPLE 3

A transfer graphic article was made as in Example 1, except the clear coat was a lacquer acrylic based material having the following formulation:

| Component | Parts |
|---|---|
| CELLOSOLVE ACETATE - ethylene glycol monoethyl ether acetate (available from Union Carbide) | 40.3 |
| CARBITOL ACETATE - diethylene glycol monoethylene ether acetate (available from Union Carbide) | 24.4 |
| ACRYLOID A-21 - methyl methacrylate solid resin (available from Rohm and Haas) | 18.6 |
| Butanol | 3.7 |
| SANITIZER 160 - butyl benzyl phthalate (available from Monsanto) | 5.6 |
| ½ Sec-CAB - cellulose acetate butyrate resin (available from Eastman Chemical) | 7.4 |

After application to a painted steel substrate, the transfer graphic also had a rounded, unitary appearance similar to that of paint.

EXAMPLE 4

A transfer graphic article was made as in Example 1, except the clear coat was an ultraviolet curable material having the following formulation:

| Component | Parts |
|---|---|
| XP-173-09 - aliphatic urethane acrylate oligomer diluted with 25 weight percent 2-ethylhexylacrylate (available from Cargill, Inc.) | 64.3 |
| Tetraethylene Glycol Diacrylate | 21.7 |
| n-Vinyl-2-Pyrrolidone | 10.0 |
| MULTIFLOW | 2.0 |
| α,α'-diethoxyacetophenone (available from Upjohn Chemical, Co.) | 2.0 |

The clear coat was applied to the graphic pattern with an overprint margin of about 5 to 125 mils (0.12 to 3.18 millimeters) using a 110 mesh screen.

The clear coat was cured by actinic radiation in a Linde PS-121 Photocure chamber at a beltspeed of 30 feet (9.1 meters) per minute in a nitrogen atmosphere.

After application to a painted steel substrate, the transfer graphic also had a rounded, unitary appearance similar to that of paint.

EXAMPLE 5

A transfer graphic article was made as in Example 1, except an ink was screen printed onto the imaging stratum prior to kiss-cutting. The ink was SCOTCHCAL Brand 3905 Ink, a polyvinyl chloride/vinyl acetate copolymer-based ink pigmented with carbon black. The ink was screen printed with a 230 mesh screen and cured at 190° F. (90° C.) for 3 minutes.

After cooling to room temperature, a clear coat was applied thereto as in Example 1.

Following application to a painted steel substrate as in Example 1, the transfer graphic had a rounded, unitary appearance similar to two parallel stripes of paint, e.g., "racing" stripes.

COMPARATIVE EXAMPLE A

A polyester film was coated with the following silicone composition:

| Component | Parts |
|---|---|
| SS-4191 (a 30 wt. % solution of dimethyl polysiloxane in toluene) | 15.0 |
| Toluene | 83.0 |
| SS-4259C (an accelerator) | 1.0 |
| SS-4192C (a silicone catalyst) | 1.0 |

(The foregoing all being commercially available from the General Electric Company).

An ink composition was then screen printed on the silicone-coated polyester with a 110 mesh screen, the composition of the ink being:

| Component | Parts |
|---|---|
| "VYHH" resin (an 87 wt. % polyvinyl chloride/13 wt. % polyvinyl acetate copolymer, available from Union Carbide) | 22.0 |
| RAVEN 1200 (a carbon black pigment available from City Surface, Inc.) | 7.8 |
| Dioctyl phthalate | 4.3 |
| SF-96-1000 - silicone flow agent available from General Electric Co.) | 0.3 |
| FC431 (a fluorocarbon flow agent) | 0.5 |
| Cyclohexanone | 31.2 |
| Isophorone | 31.2 |
| Xylene | 2.7 |

diluted with diisoamyl ketone to provide a viscosity of 1300 cps (using a Brookfield viscometer No. 3 spindle). After printing, the solvents were evaporated by heating in an air convection oven at 165° F. (75° C.).

A protective clear coat having the same formulation as that used in Example 1 was diluted with CARBITOL ACETATE to a viscosity of 500 cps (using a Brookfield viscometer, No. 3 spindle).

This formulation was then screen printed over the previously prepared ink image with an overprint margin of about 20 mils (0.50 millimeter).

The construction was then baked for two hours at about 165° F. (75° C.). During drying, the coating composition dewetted back to the edges of the ink image, thus providing excellent registration with the underlying ink areas.

An application tape, 25-508-LC, available from Laminated and Coated Products, Inc., comprising a 2.5 mil (0.06 millimeter) polyethylene backing coated with a low-tack, water-based acrylic pressure-sensitive adhesive, was laminated to the polyester film over the coated graphic pattern. The polyester film was removed, transferring the graphic pattern from the polyester film to the application tape.

The underside of the graphic pattern and exposed portions of the low-tack adhesive on the application tape were corona treated using 500 Watts at a speed of 20 feet (6.1 meters) per minute.

An adhesive formulation, comprising 19.6 weight percent adhesive polymer (isooctyl acrylate/vinyl acetate/acrylic acid in a 74/22/4 weight ratio) and 80.4 weight percent ethyl acetate, was prepared by mixing the ingredients together at room temperature; coating the solution onto a silicone-coated, white polyethylene film, 05-4-HiD-ST6A/ST3A-White available from Schoeller Release Products, Inc., to a wet thickness of about 3 mils (0.8 millimeter); and evaporating the solvent by heating for five minutes at 165° F. (75° C.). The adhesive-coated side of this film was laminated to the corona-treated side of the application tape and graphic pattern.

The silicone-coated polyethylene film was removed and the article placed on a painted steel substrate such that adhesive was in contact with the painted steel. Moderate pressure was applied to the application tape by stroking that surface with the edge of a polyethylene squeegee over the film structure. The application tape was then peeled from the substrate. The graphic design remained on the painted steel substrate and any adhesive not in registration with the graphic article remained on the application tape.

The solvent resistance of the article was then tested by immersion in a gasoline/ethanol mixture as in Example 1. After removal and drying, the graphic article was inspected to reveal disfiguring solvent attack along the edges thereof. The ink image had become rippled and rough along the edges thereof and the underlying adhesive in such areas had been leached out.

COMPARATIVE EXAMPLE B

A continuous layer of the protective clear coat composition described in Example 1 was applied to SCOTCHCAL Brand 3655 Film by screen printing the composition through a 110 mesh screen. The clear coat was cured at 165° F. (75° C.) for one hour.

The clear coat, film, and underlying adhesive were hot kiss-cut in an imagewise fashion ("racing" stripes) using a Teflon-coated, etched magnesium die at a temperature of 350° F. (175° C.) to produce edges with a tapered profile.

The weed was then removed from the carrier to produce a graphic article.

An application tape was laminated to the graphic article, and the article was applied to a painted steel substrate as in Example 1.

The solvent resistance of the graphic was then tested by immersion in a gasoline/ethanol mixture as in Example 1 and Comparative Example A. After removal and drying, the graphic was inspected whereupon it was observed that the adhesive had oozed from underneath the graphic pattern.

Comparison of the results of Examples 1 and 2 with those of Comparative Examples A and B illustrates the solvent resistance achieved by a transfer graphic of the invention wherein the protective clear coat seals both the graphic pattern and underlying adhesive and the improved solvent resistance attained as compared to that of transfer graphics wherein the clear coat is applied only to the graphic pattern and not to the exposed edges of the underlying adhesive.

Various modifications and alterations of this invention will become apparent to those skilled in the art without departing from the scope and spirit of this invention.

What is claimed is:

1. A dry transfer article for application to a substrate to provide a design thereon, said article comprising:

(A) a graphic pattern;

(B) a layer of adhesive underlying said graphic pattern in exact registration therewith, wherein said adhesive is capable of providing adhesion to said graphic pattern and said substrate; and (C) a resinous film-formed protective clear coat in precise registration with said graphic pattern and said layer of adhesive, said clear coat having a rounded profile, covering said graphic pattern, and sealing the edges of said graphic pattern and said adhesive layer.

2. The article of claim 1 wherein said graphic pattern comprises a film.

3. The article of claim 2 wherein said graphic pattern further comprises a film of at least one imaging composition which covers at least a portion of the surface of said graphic pattern.

4. The article of claim 1 wherein said protective clear coat comprises an aliphatic polyurethane.

5. The article of claim 1 wherein said protective clear coat is curable with ultraviolet radiation.

6. The article of claim 1 wherein said protective clear coat has reacted with said adhesive.

7. The article of claim 6 wherein said protective clear coat contains an isocyanate and said adhesive contains acrylic acid.

8. The article of claim 1 further comprising a release liner.

9. The article of claim 8 further comprising an application tape.

* * * * *

UNITED STATES PATENT AND TRADEMARK OFFICE

CERTIFICATE OF CORRECTION

PATENT NO. : 4,759,982

DATED : July 26, 1988

INVENTOR(S) : Jeffrey R. Janssen et al.

It is certified that error appears in the above-identified patent and that said Letters Patent is hereby corrected as shown below:

Front Page:

Under Inventors: "Jenssen" should be --Janssen--.

In the Specification:

In Column 1, line 27 "decal" should be --"decals"--.

In Column 1, lines 27-28 "transfer graphic" should be --"transfer graphics"--.

In Column 4, line 53 the second "and" should be deleted.

Signed and Sealed this

Sixth Day of December, 1988

*Attest:*

DONALD J. QUIGG

*Attesting Officer* *Commissioner of Patents and Trademarks*